United States Patent
Stone et al.

(10) Patent No.: US 9,218,145 B2
(45) Date of Patent: Dec. 22, 2015

(54) PRINT JOB MANAGEMENT

(71) Applicant: Hewlett-Packard Development Company, L.P., Houston, TX (US)

(72) Inventors: Graham Stone, Leek (GB); Neil Fraser, Warrington (GB); David Hilton, Warrington (GB); David Harrison, Warrington (GB)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 68 days.

(21) Appl. No.: 13/754,011

(22) Filed: Jan. 30, 2013

(65) Prior Publication Data

US 2014/0211242 A1    Jul. 31, 2014

(51) Int. Cl.
*G06F 3/12* (2006.01)
*G06F 21/60* (2013.01)

(52) U.S. Cl.
CPC ............ *G06F 3/1222* (2013.01); *G06F 3/1238* (2013.01); *G06F 3/1245* (2013.01); *G06F 3/1285* (2013.01); *G06F 21/608* (2013.01)

(58) Field of Classification Search
None
See application file for complete search history.

(56) References Cited

U.S. PATENT DOCUMENTS

| | | | |
|---|---|---|---|
| 6,970,259 B1 * | 11/2005 | Lunt et al. | 358/1.14 |
| 7,110,541 B1 * | 9/2006 | Lunt et al. | 380/51 |
| 7,337,472 B2 * | 2/2008 | Olsen et al. | 726/26 |
| 7,538,910 B2 | 5/2009 | Czudak et al. | |
| 7,664,956 B2 * | 2/2010 | Goodman | 713/176 |
| 7,835,024 B2 | 11/2010 | Yamada | |
| 8,253,957 B2 * | 8/2012 | Kato | 358/1.15 |
| 8,437,021 B2 * | 5/2013 | Yokoyama | 358/1.15 |
| 2002/0042884 A1 * | 4/2002 | Wu et al. | 713/201 |
| 2003/0009672 A1 * | 1/2003 | Goodman | 713/176 |
| 2003/0025932 A1 * | 2/2003 | Chiba et al. | 358/1.15 |
| 2003/0095284 A1 * | 5/2003 | Parry | 358/1.16 |
| 2003/0179412 A1 * | 9/2003 | Matsunoshita | 358/3.28 |
| 2004/0117655 A1 * | 6/2004 | Someshwar | 713/201 |
| 2004/0181661 A1 * | 9/2004 | Ferlitsch et al. | 713/153 |
| 2005/0024672 A1 | 2/2005 | Guster et al. | |
| 2005/0174594 A1 | 8/2005 | Cherry et al. | |
| 2005/0177739 A1 * | 8/2005 | Ferlitsch et al. | 713/189 |
| 2005/0197967 A1 * | 9/2005 | Booth et al. | 705/62 |
| 2005/0237557 A1 * | 10/2005 | Ferlitsch | 358/1.13 |
| 2005/0259289 A1 * | 11/2005 | Ferlitsch et al. | 358/1.14 |
| 2005/0275861 A1 * | 12/2005 | Ferlitsch | 358/1.13 |
| 2006/0053481 A1 * | 3/2006 | Olsen et al. | 726/3 |
| 2006/0187486 A1 * | 8/2006 | Tsuchitoi | 358/1.15 |
| 2007/0223038 A1 * | 9/2007 | Sato | 358/1.18 |
| 2007/0268518 A1 * | 11/2007 | Yokoyama | 358/1.15 |
| 2007/0283155 A1 * | 12/2007 | Kato | 713/171 |
| 2008/0034403 A1 * | 2/2008 | Kakigi | 726/1 |

(Continued)

OTHER PUBLICATIONS

T.D.C. Little and D. Venkatesh, "Client-Server Metadata Management for the Delivery of Movies in a Video-On-Demand System," IEEE, Jun. 27-28, 1994, pp. 11-18, Available at: <ieeexplore.ieee.org/stamp/stamp.jsp?arnumber=337783>.

*Primary Examiner* — King Poon
*Assistant Examiner* — Vincent Peren
(74) *Attorney, Agent, or Firm* — Mahamedi Paradice LLP

(57) ABSTRACT

A system for managing a print job is disclosed. Print job data is intercepted prior to being printed by a printer and a print job package is generated including the print job data as intercepted and metadata on the print job data, the print job data as intercepted being extractable from the print job package.

15 Claims, 7 Drawing Sheets

(56) References Cited

U.S. PATENT DOCUMENTS

| | | | |
|---|---|---|---|
| 2008/0168110 A1* | 7/2008 | Hagiwara | 707/204 |
| 2008/0266604 A1* | 10/2008 | Kuroki et al. | 358/1.16 |
| 2009/0040557 A1* | 2/2009 | Corlett et al. | 358/1.15 |
| 2010/0002248 A1* | 1/2010 | Nuggehalli et al. | 358/1.14 |
| 2010/0039663 A1* | 2/2010 | Ohsone | 358/1.15 |
| 2010/0060925 A1* | 3/2010 | Thomas | 358/1.15 |
| 2010/0110469 A1* | 5/2010 | Chakraborty et al. | 358/1.14 |
| 2012/0092720 A1* | 4/2012 | Jaudon et al. | 358/1.15 |

\* cited by examiner

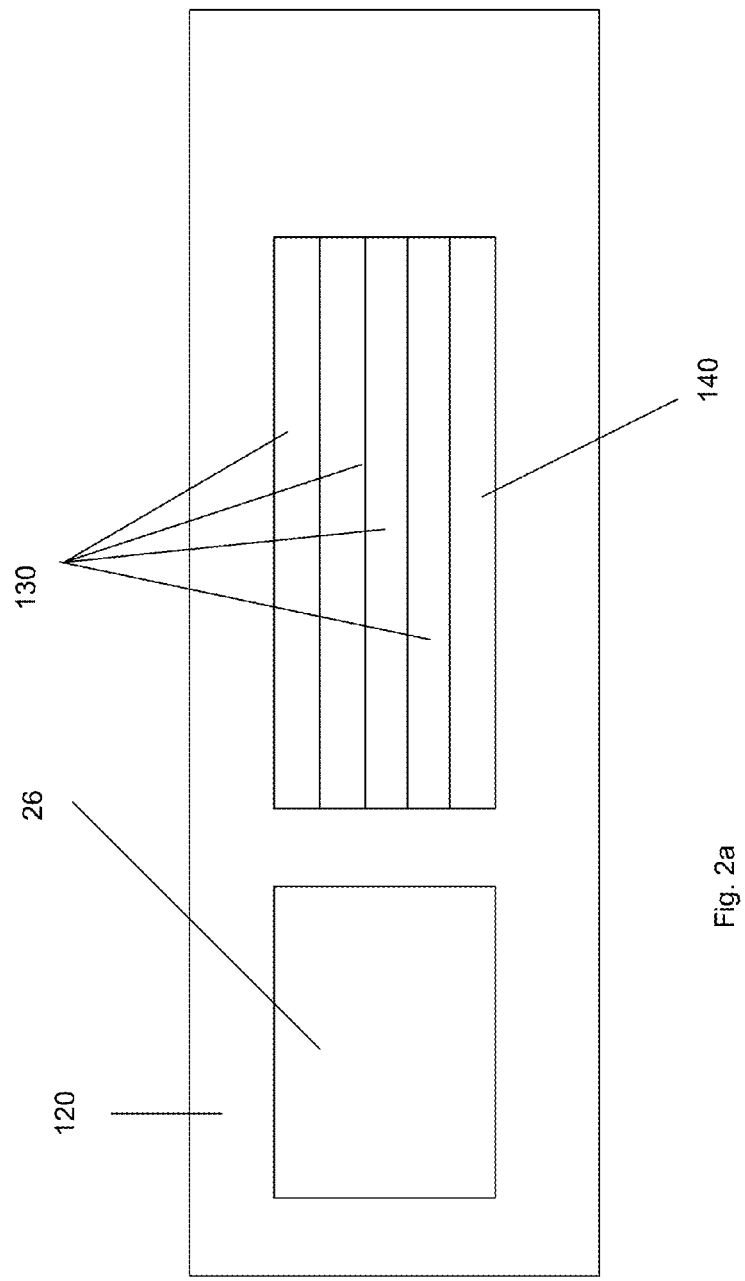

```
<SmnpData>
    <UserName>user03</UserName>
    <QueueName>pnq2-ps</QueueName>
    <JobName>BIG-1-Win7x86-User03-pnq2 - Notepad</JobName>
    <SecurityClassification>Confidential</SecurityClassification>
    <JobId>1c37465d-bca1-4558-b02e-17b9510e3198</JobId>
    <JobTime>14/01/2013 13:17:22</JobTime>
    <Signature></Signature>
</SmnpData>
```

Fig. 2b

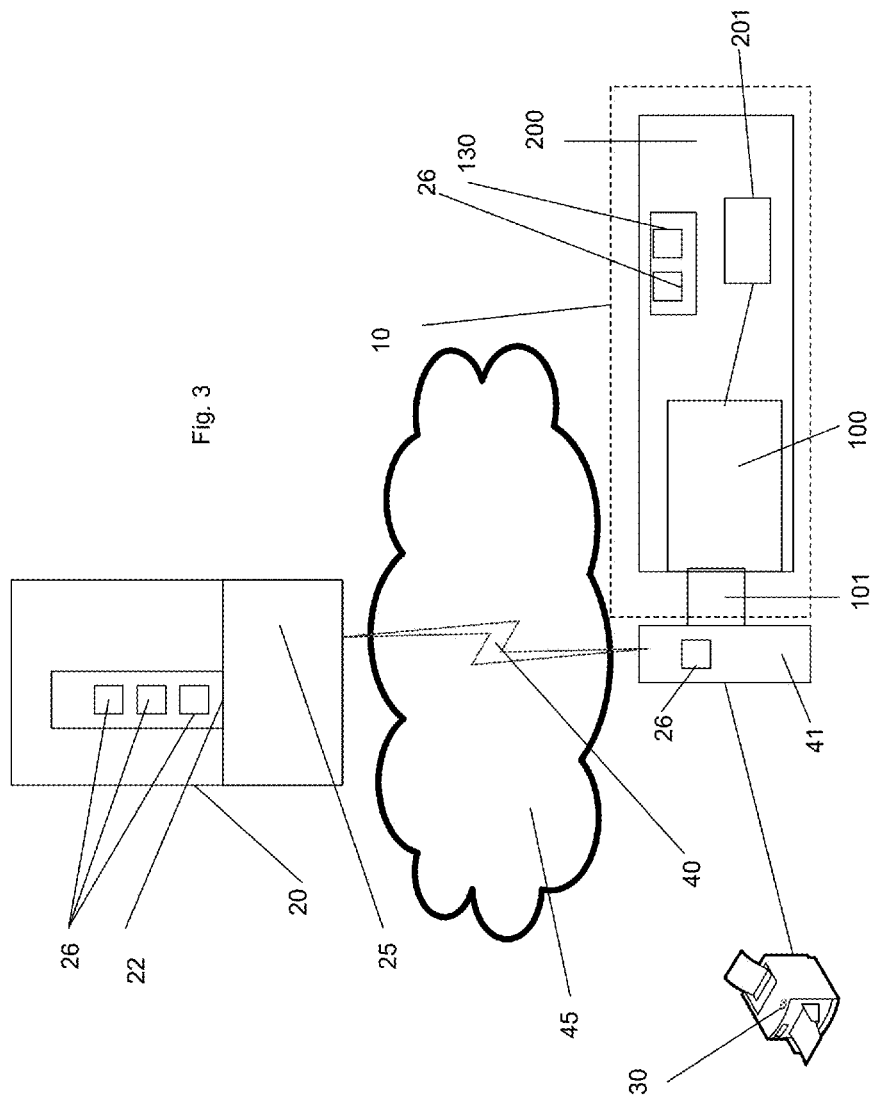

PRINT JOB MANAGEMENT

BACKGROUND

Print job management systems are used to control printing activity and also to enable policies such as security policies to be applied to print jobs.

BRIEF DESCRIPTION OF THE DRAWINGS

The accompanying drawings illustrate various examples and are a part of the specification. The illustrated examples are examples and do not limit the scope of the claims. Throughout the drawings, identical reference numbers designate similar, but not necessarily identical elements.

FIG. 2a is a schematic diagram illustrating elements of a print job package, according to various examples;

FIG. 2b is an illustration of elements of a print job package, according to various examples;

FIG. 3 is a block diagram of a print job management system according to various examples;

The same part numbers designate the same or similar parts throughout the figures.

DETAILED DESCRIPTION

Figure 1:
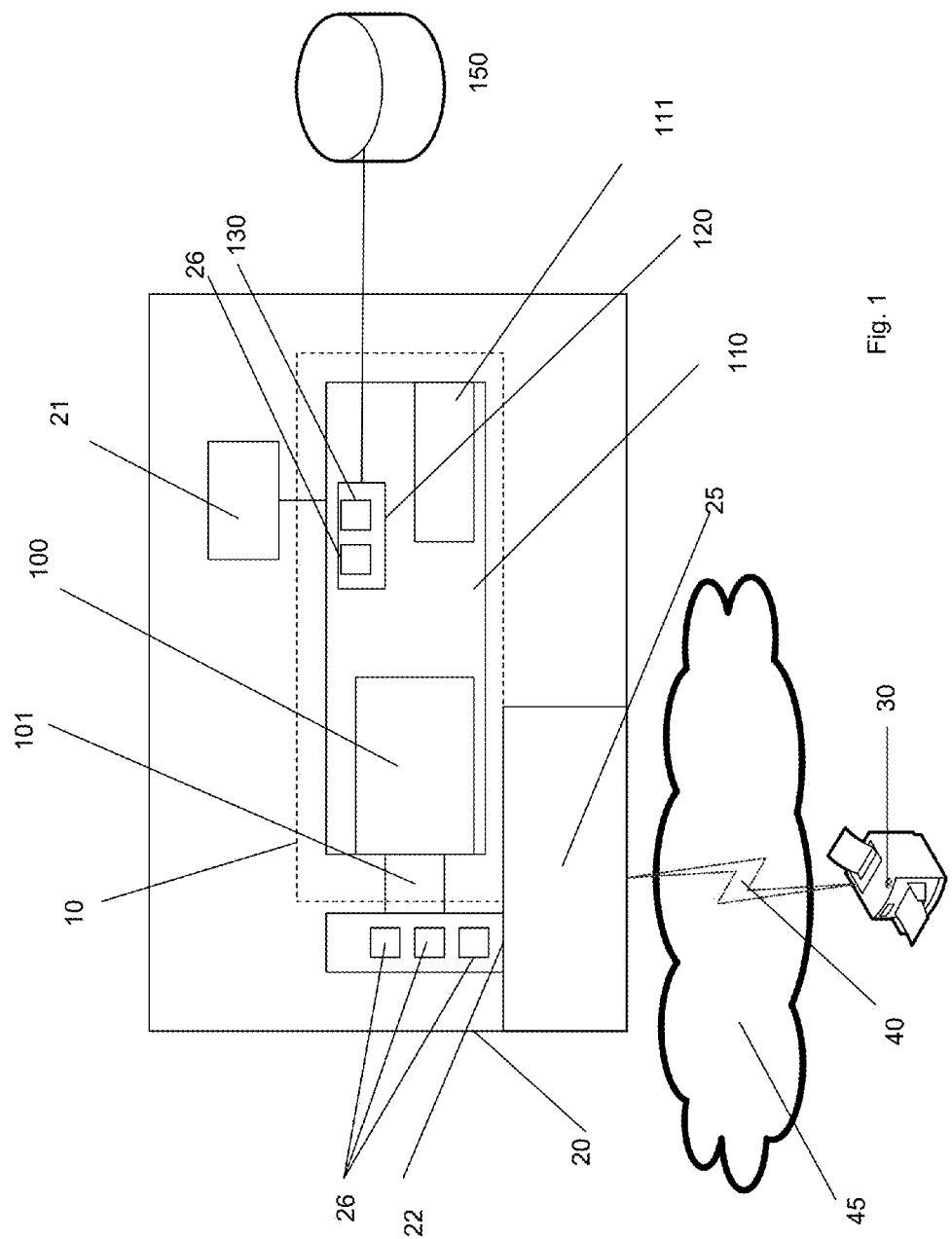
FIG. 1 is a block diagram of a print job management system according to various examples.

In certain printing infrastructures, print job management may be offered to control printing activity of individual client computer devices or networked printers. In certain printing infrastructures, print job management may also be offered for controlling allocation of print jobs across print queues or print devices. One difficulty with print job management is that management commands or information differ depending on the printer or system that is the destination of the print job. Typical problems include incompatibility of print job management systems with existing printing infrastructure or with printing systems supporting different versions of management commands. Sending management commands to an incompatible printer can lead to unpredictable results, failure to print or errors.

In certain computer networks, such as enterprise computer networks, printing infrastructures may provide one or more print servers through which client computer devices connected to the computer network may print documents or appropriate media.

In organizations or enterprises with high security requirements, such as government, military, defense, and intelligence organizations, such organizations may use multiple separate networks, with each network being independent from the other networks, and each network being used for different classifications of user or use. For example, a government organization may have a 'top secret' network, a 'secret network', a 'confidential network', a 'restricted network', and an 'unclassified' network.

One difficulty with use of multiple networks of differing security levels is that each network has to have a separate print server and associated printer or printers. Accordingly, for organizations with multiple independent networks such an arrangement leads to substantial duplication of the printing infrastructure on each of the organization's networks. One additional difficulty in the case of print is that the selected printer to which the job is routed may be physically situated some distance from the client and may not reflect the sensitivity, confidentiality or security needs of the print job.

Accordingly, various examples described herein were developed to provide a system that enables print job management in an existing printing infrastructure. In an example of the disclosure, a print job management system comprises an interception unit to intercept print job data prior to the print job data being printed by a printer; and at least one processor to generate a print job package including the print job data as intercepted and metadata on the print job data, the print job data as intercepted being extractable from the print job package.

Advantages of the examples described herein include that a print job package is generated in which print job data, as intercepted, is stored and is accessible. An advantage of including print job data as intercepted is that the print job is unmodified and is in the form it would have been passed to a printer, print server, print queue or print driver had it not been intercepted. The print job data can be extracted or otherwise recovered from the print job package and an existing print infrastructure can therefore be utilized. Another advantage is that the print job package can be used to store and communicate any metadata on the print job without modifying the print job data to include such metadata. An advantage of communicating metadata is that labels and other attributes can be communicated with the print job data and used to, amongst others, control printing, select print destinations, and associate print jobs with originating users. Another advantage is that the print job package and print job management system can be used as a stand-alone solution, or integrate with any document management or labelling solutions in place, instead of requiring a change to existing hardware or software.

Another advantage is that security labeling can be included in the metadata and used to control and optionally authenticate routing of the print job data to an appropriately classified printer, print queue or print server.

Another advantage is that data on the originator of the print job can be captured and included in the metadata. An advantage of including data on the originator is that when it is submitted to the printer, print queue or print server, the print job data can be associated with the originator for security, access rights and/or auditing purposes.

Another advantage is that the print job package can be signed to enable verification of the print job package and its content and to detect tampering or modification.

Another advantage is that a print driver, or data identifying or defining a print driver, can be included in the print job package to ensure appropriate processing of the print job data when it is to be printed or output for security and/or compatibility.

As used herein, a "printer" or "printing device" refers to any electronic device that prints and includes multifunctional electronic devices that perform additional functions such as scanning and/or copying.

FIG. 1 is a block diagram illustrating a print job management system, according to various examples. FIG. 1 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more electronic circuits, software modules, hardware modules, special purpose hardware (e.g., application specific hardware, application specific integrated circuits (ASICs), embedded controllers, hardwired circuitry, Field Programmable Gate Arrays (FPGA), etc.), or some combination of these.

FIG. 1 shows a print job management system 10. A client computer device, for example a PC, 20 is connected to a printer 30 by a communications link 40. In one example, the communications link 40 is over a data communications network 45 which may be wired, wireless or a combination of wired and wireless networks. In another example, the communications link is a direct connection between the client computer device 20 and the printer 30 which may be wired or wireless. In one example, the communications link is a USB, IEEE 1394 type, serial, parallel, IEEE 802.11 type, TCP/IP, Ethernet, Radio Frequency, fiber-optic or other type link and the client computer device includes a corresponding USB, IEEE 1394, serial, parallel, IEEE 802.11, TCP/IP, Ethernet, Radio Frequency, fiber-optic interface device, component, port or module to communicate over the communications link.

The client computer device 20 includes a printer driver module 25 that receives print job data 26 defining a print job submitted to the printer driver module 25, for example by an application executing on the client computer device 20, an operating system of the client computer device 20 or received by the client computer device 20 from a remote source. The printer driver module 25 processes the print job data 26 to generate, for example, a raster image which is then communicated to the printer 30 for printing.

In one example, an interception unit 100, separate to the printer driver module, obtains the print job data prior to the data being printed by the printer 30. In one example, the interception unit 100 obtains the print job data by intercepting it and diverting it from being communicated to the printer 30 for printing.

In one example, the interception unit 100 is a module of a client application 110 executed by a processor 21 of the client computer device. In one example, the interception unit 100 includes a port monitor 101 to monitor for print job data 26 submitted to one or more printer ports 22 of the client computer device 20.

The print job data 26 is intercepted by the interception unit 100 at the printer port or ports 22 and is packaged by the client application 110 as a print job package 120 in a format such that the print job data as intercepted can be obtained, extracted or recovered. In one example, the print job package 120 is an archive format data file such as a zip, tar, 7z, or rar archive format data file. In one example, the print job data 26 is losslessly compressed in the archive format data file.

In one example, the client computer device 20 is one of a desktop computer, an all-in-one computing device, a notebook computer, a server computer, a handheld computing device, a smartphone, a tablet computer, a print server, a printer, a self-service print kiosk, a subcomponent of a system, machine or device. In one example, the client computer device 20 includes a processor 21, a memory, an Input/Output port 22. In one example, the processor is a central processing unit (CPU) that executes commands stored in the memory. In another example, the processor 21 is a semiconductor-based microprocessor that executes commands stored in the memory. In one example, the memory includes any one of or a combination of volatile memory elements (e.g., RAM modules) and non-volatile memory elements (e.g., hard disk, ROM modules, etc.). In one example, the input/output port 22 is a logical data connection to a remote input/output port or queue such as a virtual port, a shared network queue or a networked print device.

FIG. 2a is a schematic diagram illustrating elements of a print job package 120, according to various examples. FIG. 2a includes particular components, modules, etc, according to various examples. However, in different examples, more, fewer, and/or other components, modules, arrangements of components/modules, etc. may be used according to the teachings described herein. In addition, various components, modules, etc. described herein may be implemented as software modules, data structures, encoded data, files, data streams or combinations of these.

The print job data 26 is packaged hi the print job package so that it can be extracted from the print job package 120 substantially in the form as it arrived at the printer port or ports 22. In one example, the print job data 26 in the print job package 120 is also compressed.

In one example, schematically illustrated in FIG. 2a, the print job package 120 includes metadata 130 associated with the print job data 26.

In one example, the print job data 26 remains independent of the metadata 130 in the print job package 120.

In one example, the print job package 120 has an archive data file format. In one example, the print job package 120 is a zip file.

In one example, a digital signature 140, such as a hash, cryptographic signature or some other digital signature is generated and included in the print job package 120, the digital signature being generated, at least in part, in dependence on the print job data 26 and/or the metadata 130 in the print job package 120. The digital signature enables verification of the print job data 26 and/or the metadata 130. In one example, the digital signature is included in the metadata 130. In one example, whether or not a signature is required and should therefore be present and verified is determined by a policy. In one example, the policy is centrally managed and administered using, for example, Group Policy Objects (GPO) associated with a network domain, local registry settings for the client computer device, configuration files associated with the print job management system 10 or is hard coded into the print job management system 10.

In one example, data on attributes of a user and/or device submitting the print job data 26 is captured by the interception unit 100 and encoded or included in the metadata 130. In one example, the data on attributes of the user includes a network domain user name of the user. In one example, the data on attributes of the device includes the network domain device of the device. In one example, the data on attributes of the device includes a hardware address of the device.

In one example, the metadata includes attributes including: originating user name, destination queue name, job name, security classification of the job, job identifier, job submission time and the digital signature. In one example, the metadata includes an attribute for a user name of a recipient for the print job package. In one example, the metadata includes a PIN number required to be input at a receiving printer for retrieval of the print job data.

In one example, the metadata is encoded in a markup language. In one example, the metadata is encoded in XML, as illustrated in FIG. 2b.

FIG. 2b is an illustration of at least elements of an XML format metadata, according to various examples. FIG. 2b includes particular structure, elements, components, nodes, modules, etc. according to various examples. However, in different examples, more, fewer, and/or other elements, nodes, structure, components, modules, arrangements of components/modules, etc. may be used according to the teachings described herein. In addition, various components, modules, etc, described herein may be implemented as software modules, data structures, encoded data, files, data streams or combinations of these.

Referring to FIG. 2b, the metadata defines a print job of ID "1c37465d-bca1-4558-b02e-17b9510e3198" submitted by a user having a user name "user03" to be sent to queue "pnq2-ps" having a classification "Confidential". The absence of data for the signature attribute indicates that the print job has not yet been signed, although optionally the attribute may be omitted in such circumstances.

In one example, the client application 110 includes a user interface 111 for interacting with a user to obtain selections or inputs for the metadata 130. In one example, the user interface 111 includes a field for designating a classification label for the print job package 120. In one example, the field offers the user selection of a classification label from a set including one or more of top secret, secret, confidential, restricted, and unclassified.

In one example, a default classification label is applied to print job packages, for example "Confidential". In one example, a hierarchy of classification labels may be designated and upon a user selecting a classification label having a relative designation lower than the default classification, the user is prompted to perform an authorization routine, for example by providing authorization credentials.

In one example, the classification label applied to the print job package 120 is signed to enable detection of a change in classification label.

In one example, referring again to FIG. 1, the print job package 120 is communicated to a data repository 150 for storage. In one example, the data repository is a local data store such as a hard disk, disk array, direct attached storage device, network attached storage device or similar. In another example, the data repository is a remote data store such as a data repository of a file server or web server, a network share, a storage area network or similar. The data repository and supporting infrastructure may be physical or virtual or a mixture of the two.

In one example, referring again to FIG. 1, the print job package 120 is communicated across a data communication network to a remote destination without first being stored in the data repository 150.

FIG. 3 is a block diagram illustrating a print job management system, according to various examples. FIG. 3 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more electronic circuits, software modules, hardware modules, special purpose hardware (e.g., application specific hardware, application specific integrated circuits (ASICs), embedded controllers, hardwired circuitry, Field Programmable Gate Arrays (FPGA), etc.), or some combination of these.

FIG. 3 shows a client computer device, for example a PC, 20 which is connected to a printer 30 by a print queue 41. In one example, the print queue 41 is remote of the client computer device 20 and accessed over a data communications network 45 which may be wired, wireless, or a combination of wired and wireless networks. In another example, the communications link is a direct connection between the client computer device 20 and the print queue 41 printer 30 which may hosted by the client computer device 20 or a device such as a printer or print server directly connected to the client computer device 20. In one example, the communications link is a USB, IEEE 1394 type, serial, parallel, IEEE 802.11 type, TCP/IP, Ethernet, fiber-optic or other type link and the client computer device includes a corresponding USB, IEEE 1394 type, serial, parallel, IEEE 802.11 type, TCP/IP, Ethernet, fiber-optic interface device, component, port or module to communicate over the communications link.

The client computer device 20 includes a printer driver module 25 that receives print job data 26 defining a print job submitted to the printer driver module 25 as described in connection with FIG. 1. The printer driver module 25 processes the print job data 26 to change it in form, for example to render it as a raster image. The print job data 26 is then sent to the print queue 41 for queuing to be printed by the printer 30.

In one example, the print job management system 10 includes an interception unit 100 that intercepts the print job data 26 sent to the print queue 41 prior to the print job data 26 being printed by the printer 30.

In one example, the interception unit 100 is a module of a server 200 and is executed by a processor 201 of the server 200. In one example, the interception unit 100 includes a port monitor 101 to monitor for print job data 26 sent to the print queue 41.

The print job data 26 sent to the print queue 41 is intercepted by the interception unit 100 and is packaged by the server 200 in a print job package 120

In one example, the print job package 120 is as described in connection with FIG. 2.

In one example, the server 200 is one of a desktop computer, a notebook computer, a server computer, a handheld computing device, a smartphone, a tablet computer, a print server, a printer, a self-service print kiosk, a subcomponent of a system, machine or device. In one example, the server 200 includes a processor 201 and a memory. In one example, the processor is a central processing unit (CPU) that executes commands stored in the memory. In another example, the processor 21 is a semiconductor-based microprocessor that executes commands stored in the memory. In one example, the memory includes any one of or a combination of volatile memory elements (e.g., RAM modules) and non-volatile memory elements (e.g., hard disk, ROM modules, etc.).

Figure 4:
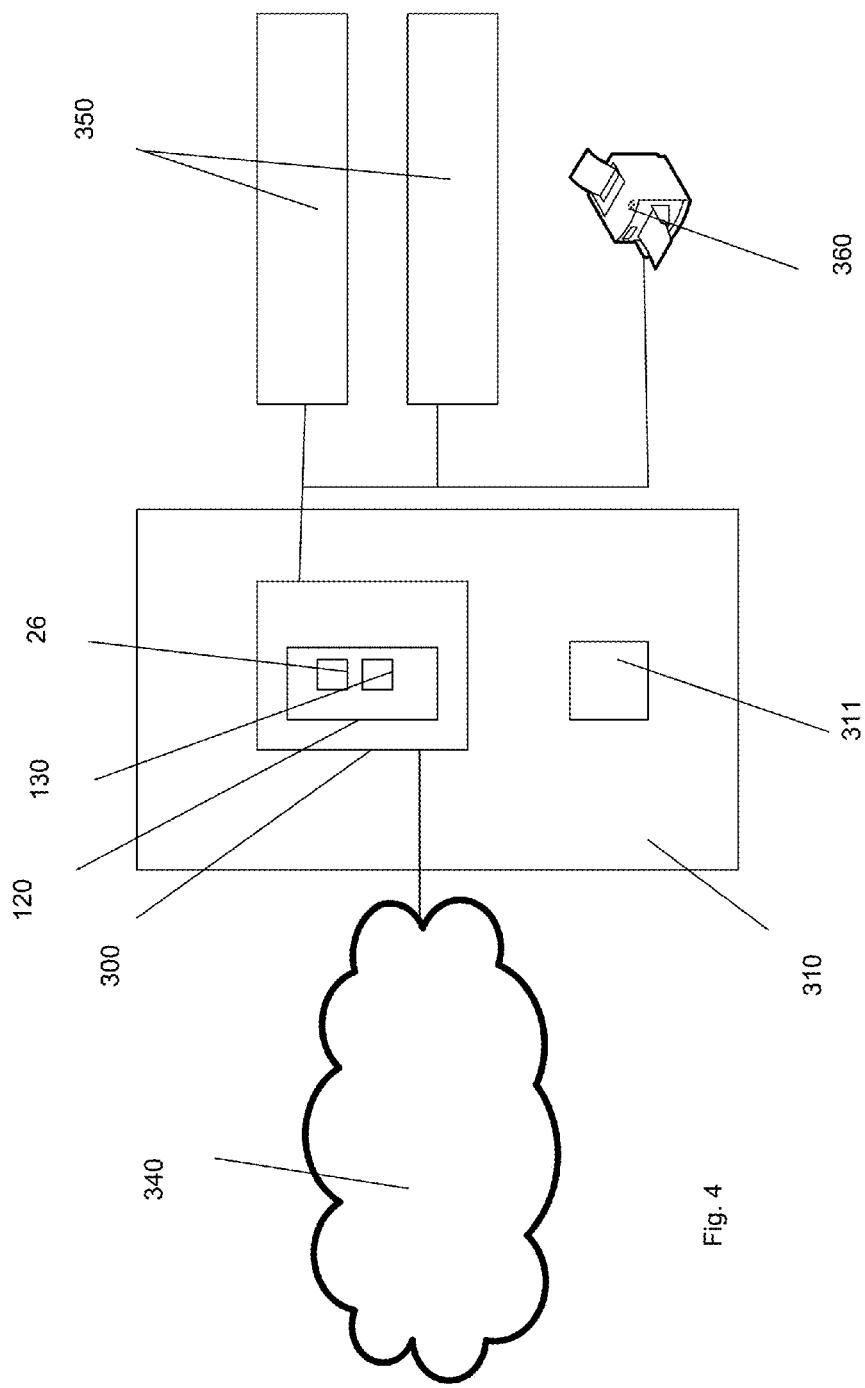
FIG. 4 is a block diagram of a print job management system according to various examples; and, FIGS. 5 and 6 are flow diagrams depicting steps taken to implement various examples.

FIG. 4 is a block diagram illustrating a print job management system, according to various examples. FIG. 4 includes particular components, modules, etc. according to various examples. However, in different examples, more, fewer, and/or other components, modules, arrangements of components/modules, etc, may be used according to the teachings described herein. In addition, various components, modules, etc. described herein may be implemented as one or more electronic circuits, software modules, hardware modules, special purpose hardware (e.g., application specific hardware, application specific integrated circuits (ASICs), embedded controllers, hardwired circuitry, Field Programmable Gate Arrays (FPGA), etc.), or some combination of these.

In one example, as shown in FIG. 4, the print job management system 10 includes a receiver unit 300. In one example, the receiver unit is a module of a server 310 and is executed by a processor 311 of the server 310. In another example, the receiver unit 300 is a module of a network interface unit of a printer 310 that is configured to receive print jobs over a network 340.

The receiver unit 300 receives print job packages 120, for example over the network 340 or via some other route (not illustrated). In one example, the receiver unit is part of a secure print network in which print jobs are communicated from an originating device, optionally via a gateway, to the receiver unit. The receiver unit 300, on receiving a print job package 120 extracts the print job data 26 and the metadata 130 from the print job package 120. If a digital signature is present, it may optionally be verified to by comparing it against the print job data and/or metadata to ensure the digital signature, print job data and/or metadata has not been modified.

The receiver unit 300 then executes computer program code in a processor 311 to process the print job data 26 in dependence on the metadata 130. In one example, the print job data 26 is entered into a print queue 350 or multiple print queues, or directed to a printer 360, with characteristics obtained from or determined from the metadata. In one example where the queue name is a populated field in the metadata it is used to direct the print job to a corresponding queue. In another example, the queue may be derived from the network, gateway or device the print job package 120 arrived from.

In one example, the metadata is processed to determine print characteristics for the print job data 26.

In one example where the classification label is a populated field in the metadata it is used to direct the print job to a queue or printer having a corresponding classification and/or to apply a watermark or other label for the classification on printing the print job.

In one example, the metadata is processed to determine auditing and/or logging to be performed for processing of the print job data 26. For example, print job packages of classification of "Confidential" or higher may be logged and print job packages of classification "Classified" or higher may be reported for auditing.

In one example, a policy associated with the receiver unit 300 or designated as being applicable in the metadata 130 or determined in dependence on the network, gateway or device from which the print job package arrives, the receiver unit 300 may be executed by the receiver unit 300 and cause further actions to take place. For example, a copy of the print job package 120, metadata 130 and/or print job data 26 may be stored in a data repository or a document management system or a billing system may be updated to reflect a cost of printing etc.

In one example, the print job is submitted to the print queue 350 for the user name identified in the metadata. In the example of FIG. 2b, the user "user03" maintains ownership and other rights for the print job, even though it may have been communicated to a remote system to which user03 is not connected and an account other than that of user03 actually submits the print job to the print queue.

In one example, a recipient account is designated in the metadata and the print job data 26 is submitted to the print queue 350 for the recipient account. Where a recipient account is designated, the print queue 350 may be configured to require authentication to the recipient account for retrieval of the print job data 26 from the print queue 350.

In one example, where a PIN number is designated in the metadata, the print job data may be protected by the PIN number when submitted to the print queue, entry of the PIN number at a printer associated with the queue being required for retrieval and printing of the print job data 26.

Figure 5:
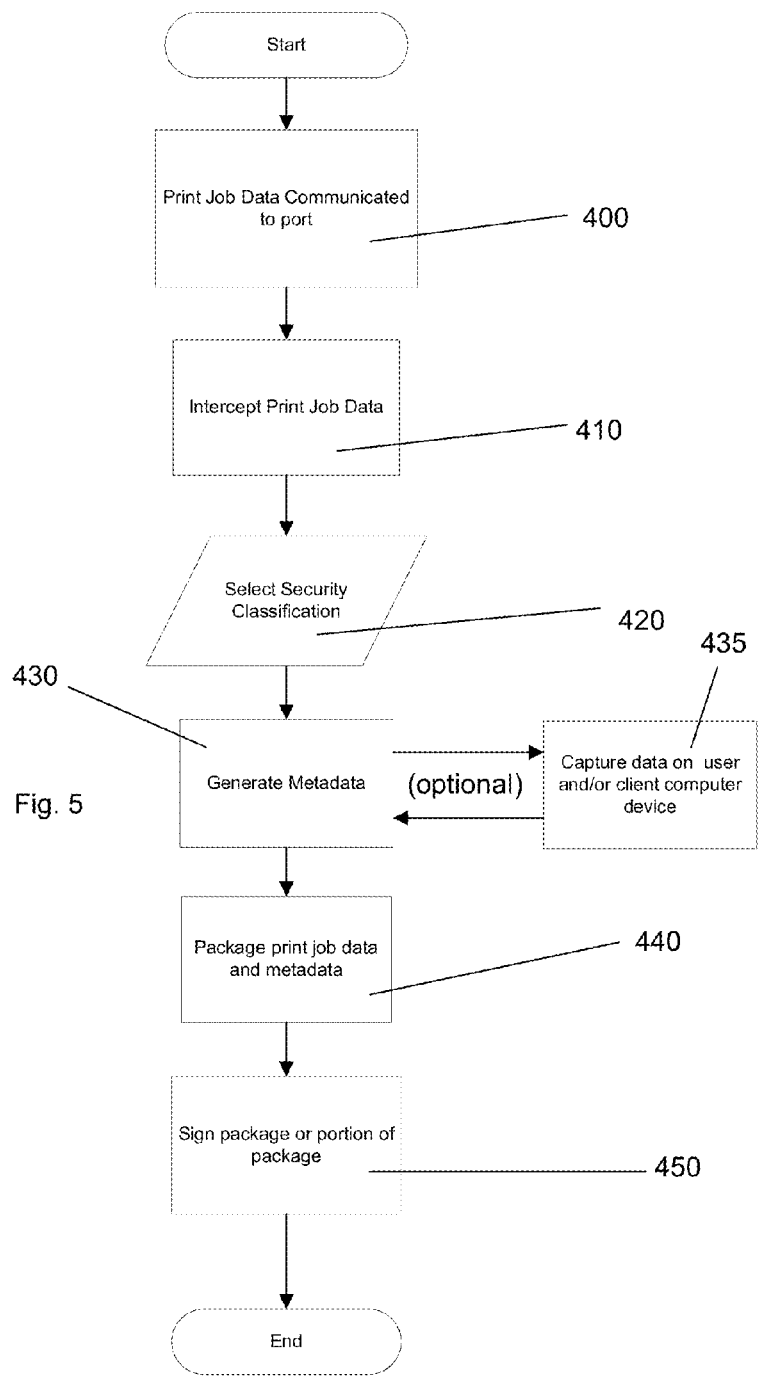

FIG. 5 is a flow diagram of operation in a method according to various examples. In discussing FIG. 5, reference may be made to the diagrams of FIGS. 1, 2a, 2b, 3, and 4 to provide contextual examples. Implementation, however, is not limited to those examples.

FIG. 5 is a flow diagram depicting steps taken to implement various examples. At step 400, when a user prints a print job from a client computer device 20, print job data 26 is communicated to a printer port 22 of the client computer device 20. At step 410, either before or after the print job data 26 is processed by a printer driver at the printer port 22 it is intercepted by an interception unit 100. At step 420, the user is prompted to select a security classification for the print job. At step 430, metadata 130 on the print job data is generated including the security classification selected by the user. Optionally in step 435, data on the user and/or the client computer device 20 is captured and encoded in the metadata 130. At step 440, the print job data as intercepted and the metadata 130 is packaged into a print job package 120 having a zip archive format, the print job data as intercepted being extractable from the zip archive format data file 120. At step 450, the zip archive format data file 120 is signed to verify its contents or at least an element of its contents.

Figure 6:
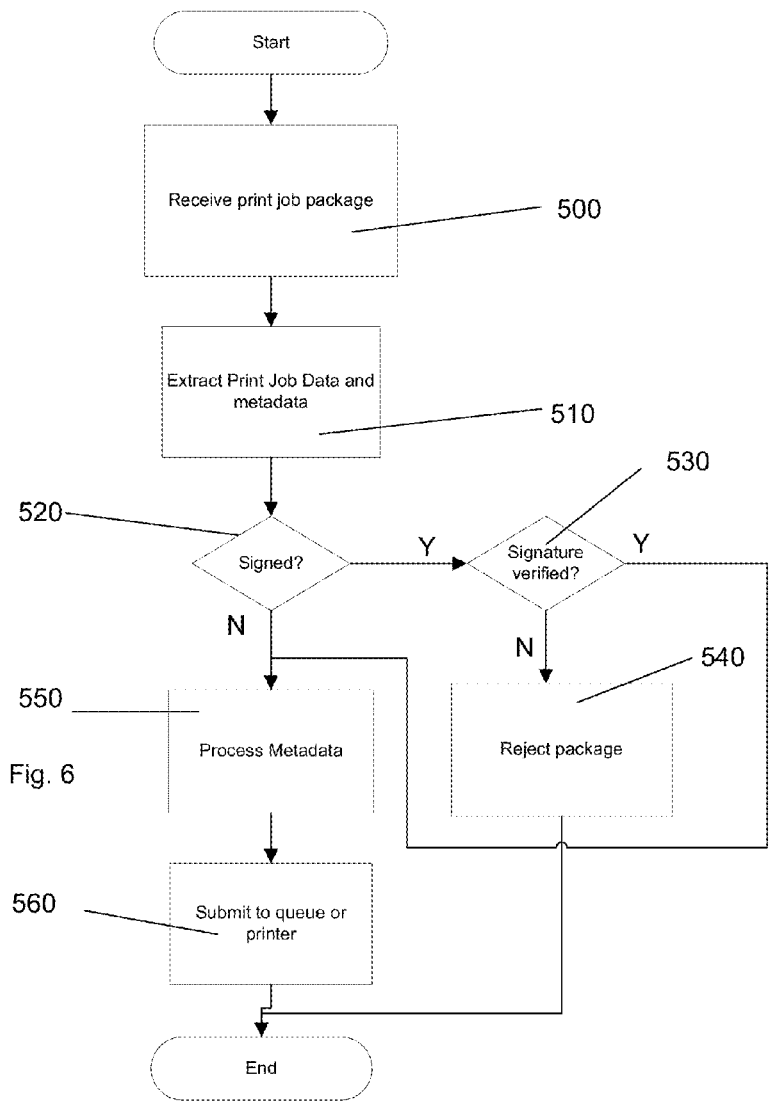

FIG. 6 is a flow diagram of operation in a method according to various examples. In discussing FIG. 5, reference may be made to the diagrams of FIGS. 1, 2a, 2b, 3, and 4 to provide contextual examples.

FIG. 6 is a flow diagram depicting steps taken to implement various examples. At step 500, a receiver unit 300 receives a zip format print job package 120. At step 510, the receiver unit 300, extracts print job data 26 and the metadata 130 from the zip format print job package 120. At step 520, a check for a digital signature is made and, if present, the digital signature is verified against content of the print job package 120 at step 530. Upon negative verification, the print job package is rejected at step 540. Upon successful verification, the metadata is processed to determine directions on how to process the print job data 26 at step 550. At step 560, the print job data is entered in a print queue or communicated to a printer for printing in dependence on the directions determined at step 550.

The functions and operations described with respect to, for example, the interception unit and receiver unit may be implemented as a computer-readable storage medium containing instructions executed by a processor and stored in a memory. Processor may represent generally any instruction execution system, such as a computer/processor based system or an ASIC (Application Specific Integrated Circuit), a Field Programmable Gate Array (FPGA), a computer, or other system that can fetch or obtain instructions or logic stored in memory and execute the instructions or logic contained therein. Memory represents generally any memory configured to store program instructions and other data.

Various modifications may be made to the disclosed examples and implementations without departing from their scope. Therefore, the illustrations and examples herein should be construed in an illustrative, and not a restrictive, sense.

What is claimed is:

1. A print job management system comprising:
   at least one processor; and
   one or more memory resources storing instructions that, when executed by the at least one processor, cause the print job management system to:
   monitor a printer port for print jobs processed by printer drivers of client devices, the print jobs being submitted from the printer drivers to the printer port over a communications network for printing;
   intercept, from the printer port, a print job submitted over the communications network by a user of a client device;
   in response to intercepting the print job, prompt the user of the client device to select one of a plurality of security classifications to be associated with the print job;

generate metadata for the print job, the metadata comprising a security label and a digital signature based on the selected security classification, the digital signature to enable printing of the print job by a specified printer; and generate a print job package including the print job and the metadata of the print job, the print job being extractable, as intercepted, from the print job package.

2. The print job management system of claim 1, wherein the executed instructions cause the print job management system to generate the print job package as an archive format data file.

3. The print job management system of claim 2, wherein absence of the digital signature in the metadata of the archive format data file causes the specified printer to reject the print job package.

4. The print job management system of claim 1, wherein the instructions, when executed by the at least one processor, further cause the print job management system to:
capture user data from the client device; and
encode the captured user data in the metadata of the archive format data file.

5. The print job management system of claim 4, wherein the executed instructions cause the print job management system to verify contents of the print job and generate the digital signature to be included in the print job package after (i) the selected security classification is selected by the user, and (ii) the captured user data is encoded in the metadata.

6. The print job management system of claim 1, wherein the executed instructions cause the print job management system to submit the print job package, including the print job and the metadata, to the specified printer, the specified printer having a security classification that corresponds to the security label.

7. A non-transitory computer-readable storage medium containing instructions that, when executed by a processor of a print job management system, cause the print job management system to:
monitor a printer port for print jobs processed by printer drivers of client devices, the print jobs being submitted from the printer drivers to the printer port over a communications network for printing;
intercept, from the printer port, a print job submitted over the communications network by a user of a client device;
in response to intercepting the print job, prompt the user of the client device to select one of a plurality of security classifications to be associated with the print job;
generate metadata for the print job, the metadata comprising a security label and a digital signature based on the selected security classification, the digital signature to enable printing of the print job by a specified printer; and
generate a print job package including the print job and the metadata of the print job, the print job being extractable, as intercepted, from the print job package.

8. The non-transitory computer-readable storage medium of claim 7, wherein the executed instructions cause the print job management system to generate the print job package as an archive format data file.

9. The non-transitory computer-readable storage medium of claim 8, wherein absence of the digital signature in the metadata of the archive format data file causes the specified printer to reject the print job package.

10. The non-transitory computer-readable storage medium of claim 9, wherein the instructions, when executed by the processor, further cause the print job management system to:
capture user data from the client device; and
encode the captured user data in the metadata of the archive format data file.

11. The non-transitory computer-readable storage medium of claim 7, wherein the executed instructions cause the print job management system to verify contents of the print job and generate the digital signature to be included in the print job package after (i) the selected security classification is selected by the user, and (ii) the captured user data is encoded in the metadata.

12. A method for managing a print job comprising:
executing instructions, by one or more processors of a print job management system, to perform operations comprising:
monitoring a printer port for print jobs processed by printer drivers of client devices, the print jobs being submitted from the printer drivers to the printer port over a communications network for printing;
intercepting, from the printer port, a print job submitted over the communications network by a user of a client device;
in response to intercepting the print job, prompt the user of the client device to select one of a plurality of security classifications to be associated with the print job;
generating metadata for the print job, the metadata comprising a security label and a digital signature based on the selected security classification, the digital signature to enable printing of the print job by a specified printer; and
generating a print job package including the print job and the metadata of the print job, the print job being extractable, as intercepted, from the print job package.

13. The method of claim 12, wherein the executed instructions cause the print job management system to generate the print job package as an archive format data file.

14. The method of claim 13, wherein absence of the digital signature in the metadata causes the specified printer to reject the print job package.

15. The method of claim 12, wherein the executed instructions cause the print job management system to verify contents of the print job and generate the digital signature to be included in the print job package after the selected security classification is selected by the user.

* * * * *